(12) United States Patent
Chou et al.

(10) Patent No.: US 12,477,168 B2
(45) Date of Patent: Nov. 18, 2025

(54) ON-LINE STREAMING LIGHT CONTROL SYSTEM AND METHOD

(71) Applicant: B'IN LIVE CO., LTD., Taipei (TW)

(72) Inventors: Yu-Yang Chou, Taipei (TW); Yu-Hsuan Wu, Taipei (TW)

(73) Assignee: B'IN LIVE CO., LTD., Taipei (TW)

( * ) Notice: Subject to any disclaimer, the term of this patent is extended or adjusted under 35 U.S.C. 154(b) by 279 days.

(21) Appl. No.: 18/458,624

(22) Filed: Aug. 30, 2023

(65) Prior Publication Data

US 2024/0223836 A1    Jul. 4, 2024

(30) Foreign Application Priority Data

Dec. 29, 2022   (TW) .................................. 111150568

(51) Int. Cl.
*H04N 21/41*        (2011.01)
(52) U.S. Cl.
CPC .............................. *H04N 21/4131* (2013.01)
(58) Field of Classification Search
None
See application file for complete search history.

(56) References Cited

U.S. PATENT DOCUMENTS

| | | | |
|---|---|---|---|
| 11,430,306 B1 * | 8/2022 | Alden | H04M 1/72403 |
| 12,369,242 B1 * | 7/2025 | McCoy | H05B 47/155 |
| 2014/0056172 A1 * | 2/2014 | Lee | H04B 10/116 |
| | | | 370/254 |
| 2015/0012308 A1 * | 1/2015 | Snyder | G06Q 10/02 |
| | | | 705/5 |

* cited by examiner

*Primary Examiner* — Samira Monshi

(57) ABSTRACT

The present invention relates to an on-line streaming light control system and method. The on-line streaming light control system includes a first unit, a second unit and a light unit. The first unit includes a file conversion module and an embedding module. The file conversion module converts a light control file into a light signal control file. The embedding module embeds the light signal control file into an audio-video file. The second unit includes an application program, and the application program includes a playing module and a first communication module. The playing module plays the audio-video file. The light unit includes a second communication module, a control module and a light-emitting module. The second communication module receives the light signal control file from the first communication module. The control module controls the light-emitting module to emit light according to the light signal control file.

10 Claims, 3 Drawing Sheets

ON-LINE STREAMING LIGHT CONTROL SYSTEM AND METHOD

REFERENCE TO RELATED APPLICATIONS

The present application is based on, and claims priority from, Taiwan application number 111150568, filed Dec. 29, 2022, the disclosure of which is hereby incorporated by reference herein in its entirety.

BACKGROUND OF THE INVENTION

Field of the Invention

The present invention relates to an on-line streaming light control system and method, and in particular, to a system and method for off-site controlling a light effect on line.

Description of the Prior Art

Nowadays, light effects have become one of necessary equipment for concerts, promotional activities or related activities. In addition to existing light equipment, participants will hold their own light-emitting hand-held devices such as glow sticks or mobile phones to add to an atmosphere or liveliness of a venue.

However, in recent years, due to an impact of the coronavirus disease 2019 (COVID-19) epidemic, people have reduced the number or frequency of group gatherings or going outs, and as a result, the above-mentioned concerts, promotional activities or related activities have been canceled to a greater or lesser extent. However, people at home still want an effect of visiting the venue in person through the audio-video and light-emitting hand-held devices.

In view of this, how to allow people to achieve the effect of visiting the venue in person through the audio-video and light-emitting hand-held devices has become a project that the current industry is urgently thinking of improving and innovating.

SUMMARY OF THE INVENTION

In view of the above-mentioned disadvantages of the prior art, after years of research and experimentation, the inventor of the present invention has finally succeeded in researching and developing an on-line streaming light control system and method of the present invention.

The present invention discloses an on-line streaming light control system, including a first unit, a second unit and a light unit. The first unit is a computer, a cloud or a server. The first unit includes a file conversion module and an embedding module. The file conversion module converts a light control file into a light signal control file. The embedding module is electrically connected to the file conversion module, receives the light signal control file from file conversion module, and embeds the light signal control file into an audio-video file. The second unit is a smart phone, a tablet computer or a computer. The second unit includes an application program, and the application program includes a playing module and a first communication module. The playing module receives the audio-video file with the light signal control file and plays the audio-video file. The first communication module is electrically connected to the playing module and receives the light signal control file. The light unit is a glow stick, a hand-held light-emitting device or a light-emitting device. The light unit includes a second communication module, a control module and a light-emitting module. The second communication module is electrically connected to the first communication module and receives the light signal control file from first communication module. The control module is electrically connected to the second communication module, and the control module receives the light signal control file from second communication module. The light-emitting module is electrically connected to the control module in such a way that the control module controls the light-emitting module to emit light according to the light signal control file.

The present invention further discloses an on-line streaming light control system, including a first unit, a second unit and a light unit. The first unit is a computer, a cloud or a server. The first unit includes a file conversion module and an embedding module. The file conversion module converts a light control file into a light signal control file. The embedding module is electrically connected to the file conversion module, receives the light signal control file from file conversion module, and embeds the light signal control file into an audio-video file. The second unit is a smart phone, a tablet computer or a computer. The second unit includes a playing module and a first communication module. The playing module receives the audio-video file with the light signal control file and plays the audio-video file. The first communication module is electrically connected to the playing module and receives the light signal control file. The light unit is a glow stick, a hand-held light-emitting device or a light-emitting device. The light unit includes a second communication module, a control module and a light-emitting module. The second communication module is electrically connected to the first communication module and receives the light signal control file from first communication module. The control module is electrically connected to the second communication module, and the control module receives the light signal control file from second communication module. The light-emitting module is electrically connected to the control module in such a way that the control module controls the light-emitting module to emit light according to the light signal control file.

In an embodiment, the first unit includes an uploading module, the uploading module is electrically connected to the embedding module, and the uploading module receives the audio-video file with the light signal control file from the embedding module and uploads the audio-video file to an audio-video platform.

In an embodiment, the embedding module compresses the light signal control file, or the file conversion module compresses the light signal control file.

The present invention further discloses an on-line streaming light control method, including steps: converting a light control file into a light signal control file: a file conversion module converting the light control file into the light signal control file; embedding the light signal control file into an audio-video file: an embedding module embedding the light signal control file into the audio-video file; and playing the audio-video file, and actuating a light unit: the audio-video file-to-be played being selected through an application program, a playing module downloading the audio-video file and playing the audio-video file, a first communication module transferring the light control file to a second communication module, and a control module controlling a light-emitting module to emit light according to the light signal control file; or the playing module downloading the audio-video file and playing the audio-video file, the first communication module transferring the light control file to the second communication module, and the control module controlling the light-emitting module to emit light according to the light signal control file.

In an embodiment, the on-line streaming light control method includes uploading the audio-video file to an audio-video platform: an uploading module uploading the audio-video file with the light control signal to the audio-video platform; the embedding module compressing the light signal control file before embedding the light signal control file into the audio-video file, or the file conversion module compressing the light signal control file after converting the light control file; and a decompression module decompressing the light signal control file and providing same for the first communication module, or the decompression module decompressing the light signal control file and providing same for the control module.

According to the above-mentioned on-line streaming light control system and method of the present invention, the light signal control file is embedded into the audio-video file before the audio-video file is uploaded to the audio-video platform, and in a case that the audio-video file is played, the light signal control file will be transferred to the light unit to make the light unit emit light in response to the audio-video file, such that audiences may enjoy light and stage effects at specific places, such as at home, on line (through a network) as if they are at the venue.

BRIEF DESCRIPTION OF THE DRAWINGS

The techniques of present invention would be more understandable from the detailed description given herein below and the accompanying figures are provided for better illustration, and thus description and figures are not limitative for present invention, and wherein.

DETAILED DESCRIPTION OF THE INVENTION

Figure 1:
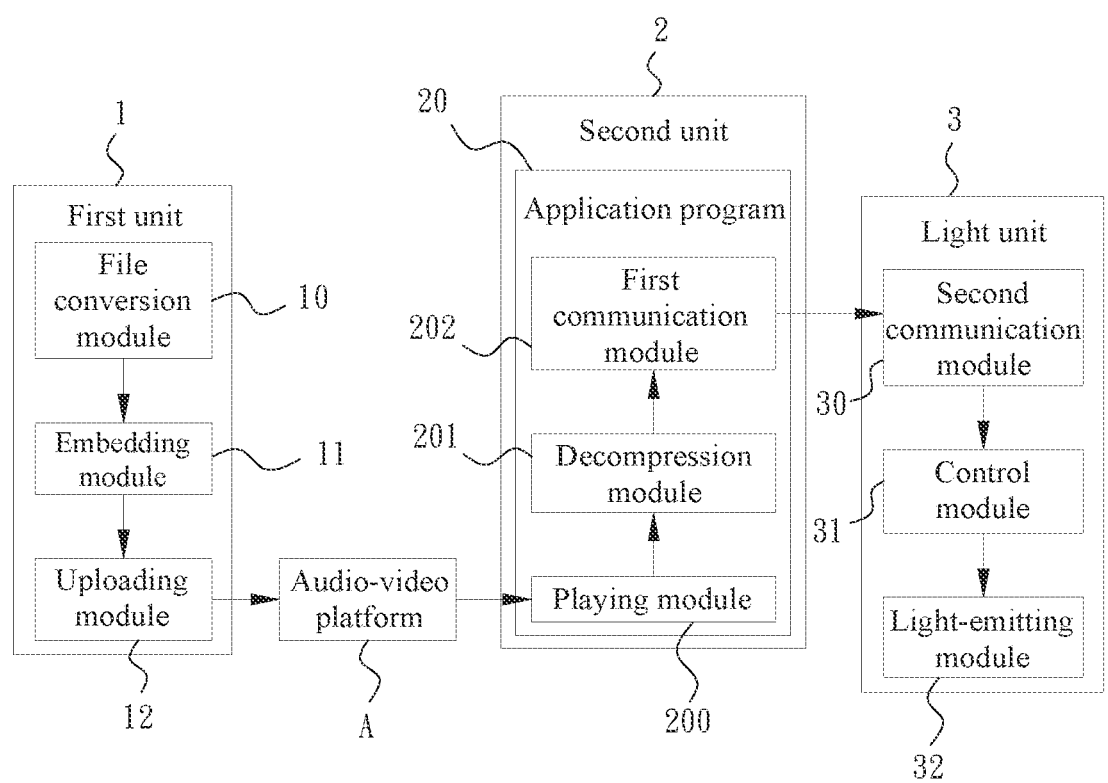
FIG. 1 is a schematic diagram of a first embodiment of an on-line streaming light control system of the present invention.

Referring to FIG. 1, it is a schematic diagram of a first embodiment of an on-line streaming light control system of the present invention. As shown in the figure, the on-line streaming light control system of the present invention includes a first unit 1, a second unit 2 and a light unit 3.

The first unit 1 is electrically connected to the second unit 2 in a wired or wireless mode. The second unit 2 is electrically connected to the light unit 3 in a wired or wireless mode.

The first unit 1 may be a computer, a cloud or a server. The first unit 1 includes a file conversion module 10, an embedding module 11 and an uploading module 12.

The file conversion module 10 converts a light control file into a light control signal file. For example, the light control file may be a light control file for a concert.

The embedding module 11 is electrically connected to the file conversion module 10. The embedding module 11 receives the light signal control file from file conversion module 10, compresses the light signal control file, and embeds the compressed light signal control file into an audio-video file. Or, the file conversion module 10 will compress the light signal control file after converting the light control file.

The uploading module 12 is electrically connected to the embedding module 11. The uploading module 12 receives the audio-video file with the light signal control file from the embedding module 11. The uploading module 12 uploads the audio-video file to an audio-video platform A. The audio-video platform A may be Youtube, iQIYI, Netflix, Disney+, LiTV, CATCHPLAY+, KKTV, LINE TV, Tencent Video, Youku, Mango TV, bilibili, TikTok, Youku, Ixigua, or the like.

The second unit 2 may be a smart phone, a tablet computer or a computer. The second unit 2 includes an application program 20. The application program 20 is provided with a playing module 200, a decompression module 201 and a first communication module 202. The playing module 200 is electrically connected to the audio-video platform A, and downloads and plays the audio-video file with the light signal control file. The decompression module 201 is electrically connected to the playing module 200 to receive the light signal control file from the audio-video file. The decompression module 201 decompresses the compressed light signal control file. The first communication module 202 is electrically connected to the decompression module 201 to receive the light signal control file from the decompression module 201.

The light unit 3 may be a glow stick, a hand-held light-emitting device or a light-emitting device. The light unit 3 is provided with a second communication module 30, a control module 31 and a light-emitting module 32. The second communication module 30 is electrically connected to the first communication module 202 to receive the light signal control file from first communication module 202. The control module 31 is electrically connected to the second communication module 30 to receive the light signal control file from second communication module 30. The light-emitting module 32 is electrically connected to the control module 31 in such a way that the control module 31 controls the light-emitting module 32 to emit light according to the light signal control file. The first communication module 202 and the second communication module 30 may be connected in a wired or wireless mode. For example, the wireless mode may be Zigbee, Bluetooth, wireless broadband (wireless network), ultra-wideband (UWB) or near field communication (NFC).

Figure 2:
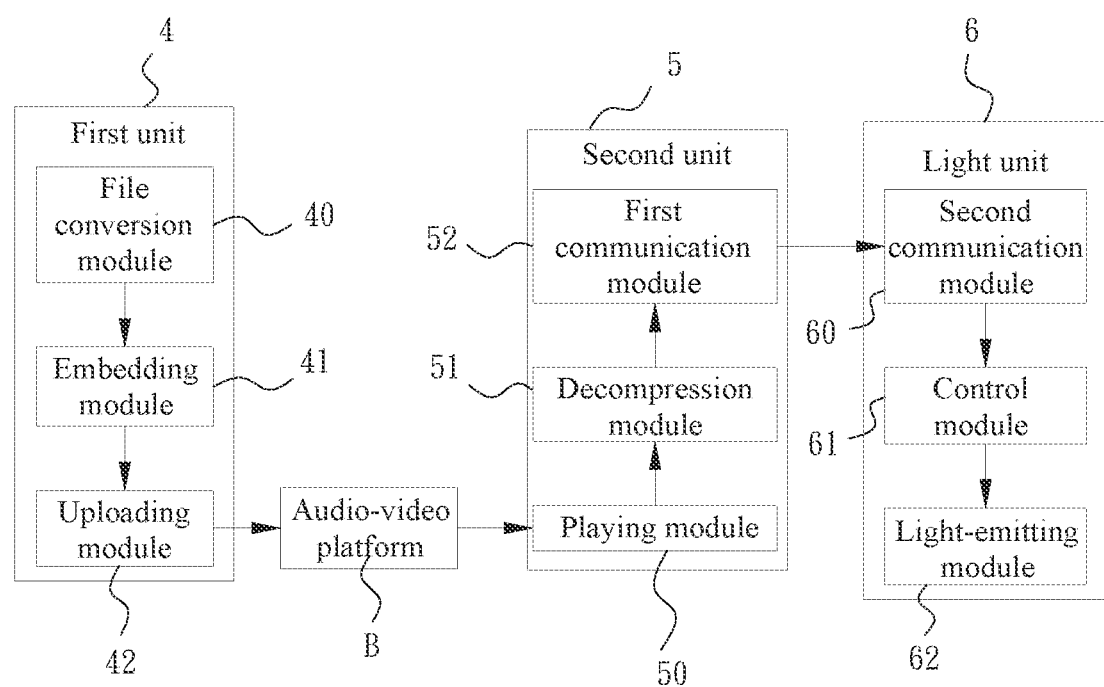
FIG. 2 is a schematic diagram of a second embodiment of an on-line streaming light control system of the present invention.

Referring to FIG. 2, it is a schematic diagram of a second embodiment of an on-line streaming light control system of the present invention. As shown in the figure, the on-line streaming light control system of the present invention includes a first unit 4, a second unit 5 and a light unit 6.

The first unit 4 is electrically connected to the second unit 5 in a wired or wireless mode. The second unit 5 is electrically connected to the light unit 6 in a wired or wireless mode.

The first unit 4 includes a file conversion module 40, an embedding module 41 and an uploading module 42. The file conversion module 40 converts a light control file into a light control signal file. The embedding module 41 is electrically connected to the file conversion module 40. The embedding module 41 receives the light signal control file from file conversion module 40 and embeds the light signal control file into an audio-video file. The light signal control file may be compressed or may not be compressed. The uploading module 42 is electrically connected to the embedding module 41. The uploading module 42 receives the audio-video file with the light signal control file from the embedding module 41. The uploading module 42 uploads the audio-video file to an audio-video platform B.

The second unit 5 may be a smart phone, a tablet computer or a computer. The second unit 5 includes a playing module 50 and a first communication module 52. The playing module 50 is electrically connected to the audio-video platform B, and downloads and plays the audio-video file. The first communication module 52 is electrically connected to the playing module 50 to receive the light signal control file from the playing module 50. If the light signal control file is a compressed file, the second unit 5 further includes decompression module 51. The decompression module 51 is electrically connected to the playing module 50 and the first communication module 52, respectively. The decompression module 51 receives the light signal control file from the playing module 50, and decompresses and transfers the light signal control file to the first communication module 52.

The light unit 6 includes a second communication module 60, a control module 61 and a light-emitting module 62. The second communication module 60 is electrically connected to the first communication module 52 to receive the light signal control file from first communication module 52. The control module 61 is electrically connected to the second communication module 60 to receive the light signal control file from second communication module 60. The light-emitting module 62 is electrically connected to the control module 61 in such a way that the control module 61 controls the light-emitting module 62 to emit light according to the light signal control file. If the second unit 5 is not provided with the decompression module 51, the light unit 6 may include a decompression module (not shown in the figure). The decompression module is electrically connected to the second communication module 60 and the control module 61, respectively. The decompression module receives the light signal control file from the second communication module 60, and decompresses and transfers the light signal control file to the control module 61.

Figure 3:
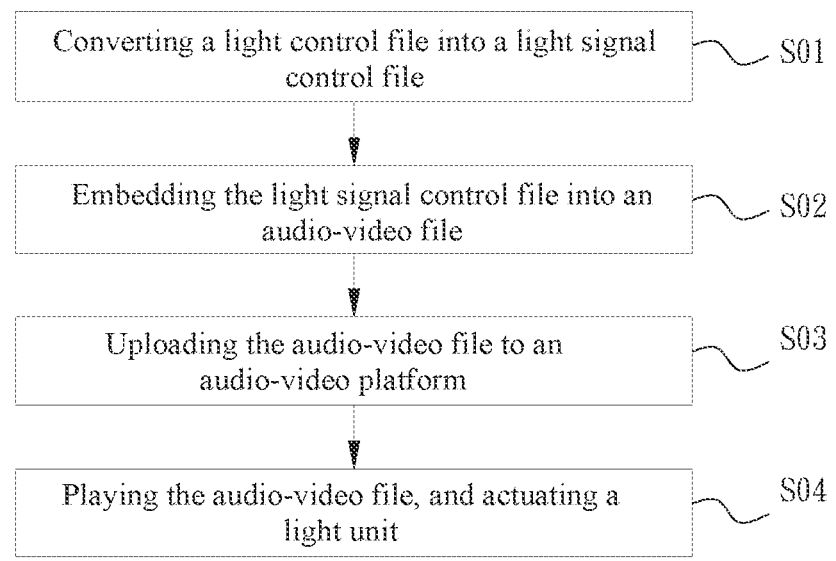
FIG. 3 is a schematic flow diagram of an on-line streaming light control method of the present invention.

Referring to FIG. 3, it is a schematic flow diagram of an on-line streaming light control method of the present invention. As shown in the figure, the on-line streaming light control method of the present invention includes the following steps:

Step S01, converting a light control file into a light signal control file: a file conversion module converting the light control file for a concert into the light signal control file;

Step S02, embedding the light signal control file into an audio-video file: an embedding module embedding the light signal control file into the audio-video file, where the embedding module compresses the light signal control file before embedding the light signal control file into the audio-video file, or the file conversion module compresses the light signal control file after converting the light control file;

Step S03, uploading the audio-video file to an audio-video platform: an uploading module 12 uploading the audio-video file with the light control signal to the audio-video platform A; and Step S04, playing the audio-video file, and actuating a light unit: referring to FIG. 1 again, an application program 20 being electrically connected to the audio-video platform A, the audio-video file-to-be played being selected through the application program 20 and the audio-video platform A, and a playing module 200 downloading the audio-video file and playing the audio-video file, where a decompression module 201 decompresses and transfers the light signal control file to the second communication module 30 through the first communication module 202, and a control module 31 controls a light-emitting module 32 to emit light according to the light signal control file.

In addition, referring to FIG. 2 again, the audio-video file-to-be-played is selected through the audio-video platform B, and the playing module 50 plays the audio-video file. The decompression module 51 receives the light signal control file from the playing module 50, and decompresses and transfers the light signal control file to the first communication module 52. The first communication module 52 transfers the light signal control file to the second communication module 60. The control module 61 controls a light-emitting module 62 to emit light according to the light signal control file. If decompression is not performed before the first communication module 52 transfers the light signal control file to the second communication module 60, the decompression module receives the light signal control file from the second communication module 60, and decompresses and transfers the light signal control file to the control module 61.

To sum up, according to the on-line streaming light control system and method of the present invention, the light signal control file is embedded into the audio-video file before the audio-video file is uploaded to the audio-video platform, and in a case that the audio-video file is played, the light signal control file will be transferred to the light unit to make the light unit emit light in response to the audio-video file, such that audiences may enjoy light and stage effects at specific places, such as at home, on line (through a network) as if they are at the venue.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention

What is claimed is:

1. An on-line streaming light control system, comprising:
a first unit, being a computer, a cloud or a server, and comprising:
a file conversion module, converting a light control file into a light signal control file; and
an embedding module, electrically connected to the file conversion module, receiving the light signal control file from the file conversion module, and embedding the light signal control file into an audio-video file;
a second unit, being a smart phone, a tablet computer or a computer, the second unit comprising: an application program, and the application program comprising:
a playing module, receiving the audio-video file with the light signal control file and playing the audio-video file;
a first communication module, electrically connected to the playing module and receiving the light signal control file; and
a light unit, being a glow stick, a hand-held light-emitting device or a light-emitting device, the light unit comprising:
a second communication module, electrically connected to the first communication module and receiving the light signal control file from the first communication module;
a control module, electrically connected to the second communication module, the control module receiving the light signal control file from the second communication module; and a light-emitting module, electrically connected to the control module in such a way that the control module controls the light-emitting module to emit light according to the light signal control file.

2. The on-line streaming light control system according to claim 1, wherein the first unit comprises an uploading module, the uploading module is electrically connected to the embedding module, and the uploading module receives the audio-video file with the light signal control file from the embedding module and uploads the audio-video file to an audio-video platform.

3. The on-line streaming light control system according to claim 1, wherein the embedding module compresses the light signal control file, or the file conversion module compresses the light signal control file.

4. The on-line streaming light control system according to claim 3, wherein the application program comprises a decompression module, the decompression module is electrically connected to the first communication module and the playing module, and the decompression module decompresses the light signal control file; or the light unit comprises a decompression module, the decompression module is electrically connected to the control module and the second communication module, and the decompression module decompresses the light signal control file.

5. An on-line streaming light control system, comprising:
a first unit, being a computer, a cloud or a server, and comprising:
  a file conversion module, converting a light control file into a light signal control file; and
  an embedding module, electrically connected to the file conversion module, receiving the light signal control file from the file conversion module, and embedding the light signal control file into an audio-video file;
a second unit, being a smart phone, a tablet computer or a computer, the second unit comprising:
  a playing module, receiving the audio-video file with the light signal control file;
  a first communication module, electrically connected to the playing module and receiving the light signal control file; and
a light unit, being a glow stick, a hand-held light-emitting device or a light-emitting device, the light unit comprising:
  a second communication module, electrically connected to the first communication module and receiving the light signal control file from the first communication module;
  a control module, electrically connected to the second communication module, the control module receiving the light signal control file from the second communication module; and
  a light-emitting module, electrically connected to the control module in such a way that the control module controls the light-emitting module to emit light according to the light signal control file.

6. The on-line streaming light control system according to claim 5, wherein the first unit comprises an uploading module, the uploading module is electrically connected to the embedding module, and the uploading module receives the audio-video file with the light signal control file from the embedding module and uploads the audio-video file to an audio-video platform.

7. The on-line streaming light control system according to claim 5, wherein the embedding module compresses the light signal control file, or the file conversion module compresses the light signal control file.

8. The on-line streaming light control system according to claim 7, wherein the second unit comprises a decompression module, the decompression module is electrically connected to the first communication module and the playing module, and the decompression module decompresses the light signal control file; or the light unit comprises a decompression module, the decompression module is electrically connected to the control module and the second communication module, and the decompression module decompresses the light signal control file.

9. An on-line streaming light control method, comprising steps:
converting a light control file into a light signal control file: a file conversion module converting the light control file into the light signal control file;
embedding the light signal control file into an audio-video file: an embedding module embedding the light signal control file into the audio-video file; and
playing the audio-video file, and actuating a light unit: the audio-video file-to-be played being selected through an application program, a playing module downloading the audio-video file and playing the audio-video file, a first communication module transferring the light control file to a second communication module, and a control module controlling a light-emitting module to emit light according to the light signal control file; or the playing module downloading the audio-video file and playing the audio-video file, the first communication module transferring the light control file to the second communication module, and the control module controlling the light-emitting module to emit light according to the light signal control file.

10. The on-line streaming light control method according to claim 9, comprising uploading the audio-video file to an audio-video platform: an uploading module uploading the audio-video file with the light control signal to the audio-video platform; the embedding module compressing the light signal control file before embedding the light signal control file into the audio-video file, or the file conversion module compressing the light signal control file after converting the light control file; and a decompression module decompressing the light signal control file and providing same for the first communication module, or the decompression module decompressing the light signal control file and providing same for the control module.

* * * * *